United States Patent [19]

Schwartzman et al.

[11] Patent Number: 4,779,335

[45] Date of Patent: Oct. 25, 1988

[54] DOUBLE ACTION CRIMPING TOOL

[75] Inventors: Benjamin Schwartzman, Hagerstown, Md.; Robert Volinskie, Hershey, Pa.

[73] Assignee: AMP Incorporated, Harrisburg, Pa.

[21] Appl. No.: 79,205

[22] Filed: Jul. 29, 1987

[51] Int. Cl.[4] .......... B23P 19/04

[52] U.S. Cl. .......... 29/751; 81/353

[58] Field of Search .......... 29/751, 750, 752, 758, 29/748; 81/128, 129, 352, 353, 354

[56] References Cited

U.S. PATENT DOCUMENTS

| | | | |
|---|---|---|---|
| 2,684,003 | 7/1954 | Klinger | 29/751 |
| 2,887,916 | 5/1959 | Freedom | 72/407 |
| 3,009,503 | 11/1961 | Holtzapple | 29/751 |
| 3,029,670 | 4/1962 | Over et al. | 29/751 |
| 3,174,323 | 3/1965 | Over | 72/412 |
| 3,205,568 | 9/1965 | Stull | 29/751 |
| 4,589,271 | 5/1986 | Laux | 29/751 |

OTHER PUBLICATIONS

AMP Tooling, p. 6.

AMP Tools, Applicators, and Machines, PM 5182, Rev 2/84, pp. 1/14, 1/15, 1/17.

*Primary Examiner*—P. W. Echols

*Attorney, Agent, or Firm*—William B. Noll; James M. Trygg

[57] ABSTRACT

A tool for crimping electrical terminals (10) to terminate conductive wires (20) by inelastic deformation of portions of the terminal includes a motor driven cam (42) connected to toggle linkage (48) adapted to drive a double acting linkage (30,32) to effect die displacement against the terminal through a disk (78) mounted for rotary movement in a race (80), the double acting linkage providing an enhanced mechanical advantage in the high force requirement zone of die displacement.

10 Claims, 4 Drawing Sheets

DOUBLE ACTION CRIMPING TOOL

The present invention relates to a tool and mechanism for crimping electrical terminals to conductive wires utilizing a double action driving linkage driven by a cam, in turn driven by a motor.

BACKGROUND OF THE INVENTION

The concept of crimping electrical terminals to permanently terminate electrical wires is widely accepted in industry for both power and signal uses. In general, a connector or terminal is made of conductive metals such as copper or alloys thereof to include a forward portion shaped to be engaged by a post or tab or equivalent structure and a rearward portion having a preformed shape adapted to receive a conductor inserted or laid therein with the rearward portion thereafter being inelastically deformed to effect an intimate and gas type metallurgical bonding of the metal of the terminal to the metal of the conductive wire. In this process, a wide variety of crimp shapes and geometries have evolved including a family of crimps which initially are tubular to receive wires inserted therein and a family of crimps which are U-shaped to receive wires laid therein with terminal ears folded thereover. In most cases, the terminal portions are deformed through the elastic region and into an inelastic deformation leading to the extrusion of the surfaces of the terminal and the wires to effect a long lived and permanent electrical joint. This is accomplished by dies of different shapes for differently designed crimps, such dies being in turn driven by a variety of mechanisms which may be incorporated into hand tools or through the use of mechanized sources of force including electric motor driven presses, air presses or in the high force region, hydraulic presses. In all cases, the requirements of the crimp involve essentially a displacement of dies requiring a certain force versus the travel of the dies, a certain work in terms of inch pounds, and a certain frictional load over and above the work actually required for deformation of the terminal and wire. These various requirements are intrinsic to the terminal and wire of use and must be met, and in fact exceeded by the mechanism including the dies employed to effect crimps.

In all the foregoing, the constant problem has been one which relates to the fact that to effect a good crimp, exceedingly high forces are required in the tail end of total displacement, forces in excess of 500 pounds to 6,000 pounds being commonly required for a wide variety of crimps of terminals to wires in the range of 10 or 12 up to 26 AWG. As a general rule, the initial forces required are quite low, on the order of 50 to 100 or 150 pounds with the high forces coming only in the last ten percent of the total displacement required. The general answer to this requirement has been to provide sources of force and work far greater than actually required by the terminal, making for both inefficiency and added cost of crimping tools. When employed in factories for high volume usage with ready sources of inexpensive power, these inefficiencies become almost irrelevant to a highly leveraged amortization due to volume. In what is known as premise wiring wherein relatively few terminations are done per day per site, the concept of overpowering the requirements of the crimp and the relatively high costs of tooling associated therewith, becomes unattractive and unacceptable from a design standpoint. As an example, the so-called bench press crimping tools driven by motors ranging from a tenth to one horse power, employ clutch mechanisms and drive linkages capable of hundreds, if not thousands of inch pounds of work are employed to crimp terminals which range between 20 and 120 inch pounds of work actually required. In the factory where thousands of crimps per day may be expected for a crimping press, this kind of overdesign is readily acceptable, at least economically. In premise wiring and in the field where a given crimping tool may do 10 to 100 crimps per day, the economics of this prior approach are unacceptable. So too with respect to the use of energy where the cost of power per crimp in a factory is relatively insignificant, compared with the cost of energy on premise which may have to be at a given time, specially introduced to a given premise location for the few hours needed for the few crimps for that particular job site.

SUMMARY OF THE INVENTION

The present invention provides a highly efficient matching of the forces required to effect the crimping of electrical terminals to electrical wires through tooling incorporating a linkage which intrinsically yields a force displacement characteristic generating a higher mechanical advantage at the tail end of die displacement than heretofore utilized. It does this by a double action linkage which in essence doubles the effective displacement available in the last few percent of movement of the linkage where mechanical advantage approaches infinity as contrasted with single action linkages. The invention tooling and mechanism embraces displacement of both dies against a terminal to effect crimping, with each of the dies being driven or tensioned by one arm of a double action linkage mechanism, in turn driven by a disk and toggle from a cam and motor which may be cycled on and off or in certain instances, operated continuously to be selectively engaged through toggle mechanism, eliminating the need for the usual clutch interposed between source of force and load. The dies of the invention mechanism are connected to the rotary disk element contained in a race driven by the toggle in turn driven by a cam follower through a cam and motor mechanism. It is an object of the present invention to provide an improved crimping mechanism having a force travel characteristic compatible to that of terminals in such a way as to reduce the power requirements from that heretofore employed for motorized crimping devices. It is a further object to provide a mechanism including a double acting linkage to effect the crimping of electrical terminals to conductive wires. It is yet a further object to provide a crimping mechanism of improved efficiency for field use.

DESCRIPTION OF THE INVENTION

Figure 1:
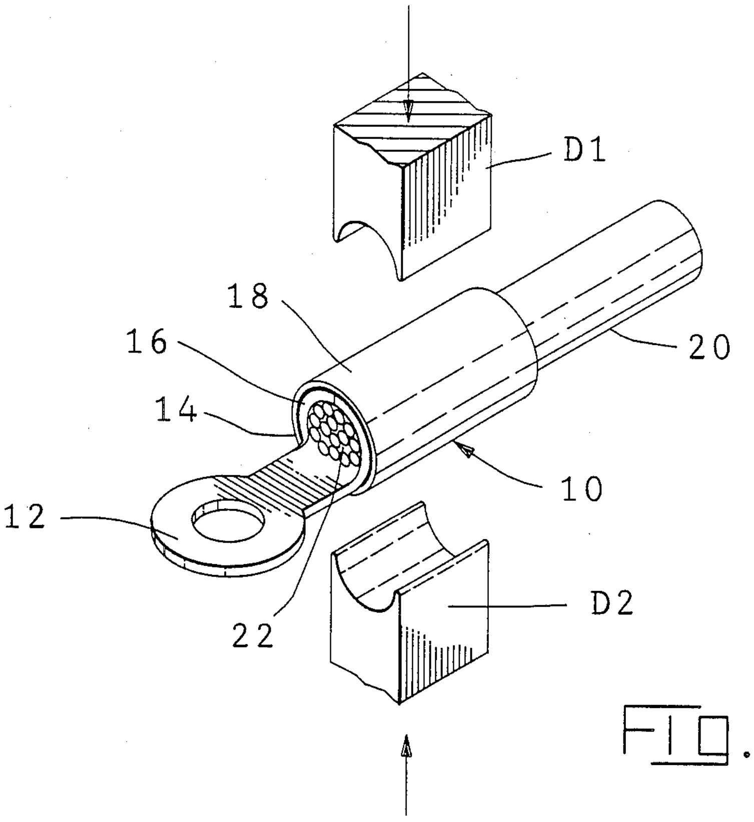
FIG. 1 is a perspective showing an electrical terminal having an electrical wire inserted therein preparatory to being crimped by dies shown positioned prior to crimping.

Referring first to FIG. 1, there is shown an electrical terminal 10 which is typical of a family of terminals which are pre-insulated through the use of a sleeve of plastic made to surround the crimping portion of the terminal and through which crimping is effected. The terminal 10 represents one form of such terminals having a ring tongue 12 at one end adapted to be placed over a threaded post and held in intimate contact with an electrical circuit through a nut threaded down over such post to clamp the ring tongue 12 in place. The terminal 10 includes a barrel portion 14 which is tubular in shape as shown in FIG. 1 adapted to receive the insertion of bare conductor wires therein. In the version shown in FIG. 1, portion 14 contains further therearound a tubular element shown as 16 which is typically of copper or other alloys of copper and carrying on the outside thereof an insulating plastic sleeve 18 which may be of an extruded or otherwise formed engineering plastic material such as nylon or PVC or the like. The electrical wire is shown as 20 and typically includes an insulation jacket about a series of strands 22 which are inserted within the tubular or barrel portion 14 of the terminal. The wire 20 is representative of a wide variety of types of wires which may alternatively be solid but more usually stranded and formed of copper which may be either plated or left unplated, depending upon the application, and covered over with the insulation jacket of PVC or polyethylene or the like. Typically, the wire 20 has its end stripped prior to insertion within the barrel portion 14 of the terminal. Also shown in FIG. 1 and poised prior to closure upon the terminal are a set of dies D1 and D2, typically of steel which in practice will be driven inwardly against the surface of the plastic sleeve 18 to deform such sleeve, the tube 16 and the barrel portion 14 of the terminal inwardly and permanently to cause a bonding through the extrusion and movement of terminal and wire surfaces and the inelastic deformation of the surrounding metal portions of the terminal in engagement with such wires.

Figure 2:
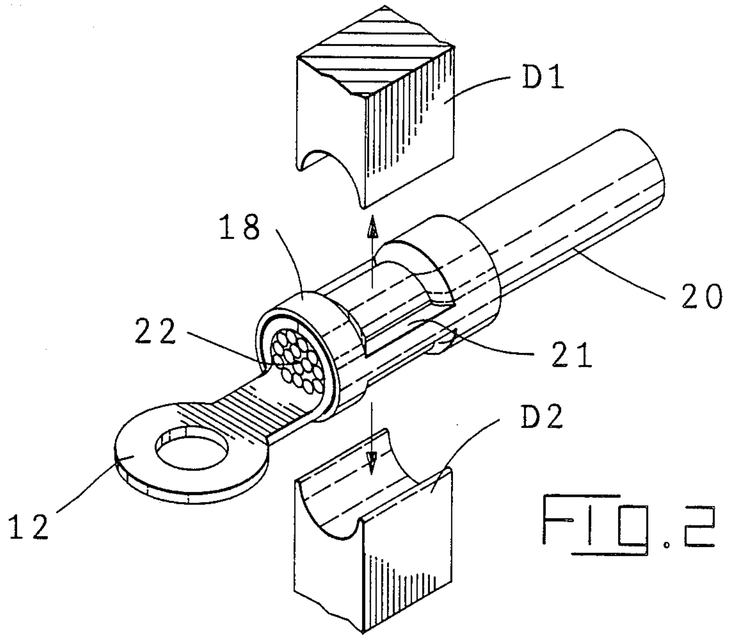
FIG. 2 is a view of the terminal and dies of FIG. 1 following crimping of the terminal.

The resulting deformation 21 is shown in FIG. 2 following displacement of the dies D1 and D2 to represent the permanent deformation of the terminal and the permanent joining of the terminal to the electrical wire 20. By the precise control of dimensions of the terminal and characteristics thereof and the precise control of the displacement of the dies D1 and D2 through precision tooling, terminals may be crimped to wires over and over again to effect a highly reliable and permanent connection relatively independent of the skill of the operator of the tooling to accomplish this task.

Figure 3:
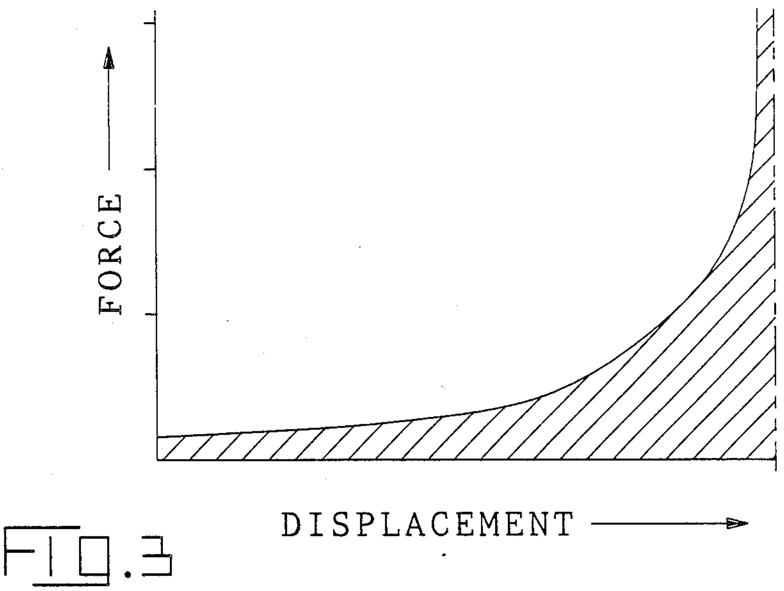
FIG. 3 is a force travel diagram depicting a typical force travel curve for electrical terminals.

FIG. 3 is a graphic illustration showing a force travel characteristic for the types of terminals under discussion; namely, terminals that are inelastically deformed to effect a permanent connection to conductor wire. In the representation of FIG. 3, the ordinate may be seen to represent a force change in pounds from zero to 2,000 pounds and the abscissa may be seen to represent displacement from zero to 0.100 inches. This force characteristic can be seen in FIG. 3 to begin and extend over a considerable portion of the total displacement with relatively low force, the higher force coming only in the last small percentage or tail end of the total displacement. The vertical line proximate to the end of displacement represents an asymtotic approach of the force curve at the end of travel of the tooling effecting crimping. This can be understood in the context that the dies D1 and D2 are driven until they bottom, the crimping action being limited to a precise height. Frequently such practice is resorted to to control displacement allowing for a measurement of the crimped terminal to evidence proper crimping. The shaded area beneath the curve represents force and travel, in essence, representing work done in the crimping process and is represented by inch pounds. As can be appreciated from the curve of FIG. 3, the geometry of the terminal allows for a relatively easy elastic deformation for the first portions of displacement of the dies against the terminal with the higher forces occurring as the metal and plastic parts are forced to be extruded axially and radially together with the conductors of the electric wire. The force travel characteristic shown in FIG. 3 is typical of a closed barrel ring tongue terminal adapted for use with a 20 AWG electric wire. Different force/travel characteristics may be found for smaller and larger terminals with an appropriate reduction or increase in the maximum forces required and in the displacement associated with such terminal. A similar curve also characterizes so-called open barrel terminals which are U-shaped rather than tubular although in such case, the force characteristic may increase earlier in the displacement due to the folding of portions of the terminal. The invention contemplates a use for U-shaped ferrules and so-called "F" crimps as well.

With respect to mechanisms for effecting die displacement to effect crimps like that shown in FIG. 2, and achieve the necessary force travel characteristics like that shown in FIG. 3 and the work related thereto, the tool used must provide at least as much work as is required and as at least as much force as is required during displacement and at the end. In practice it must be made to also accommodate for frictional losses and for the elastic deformations of the tool and linkages involved for the particular choice of mechanism employed.

Figure 4:
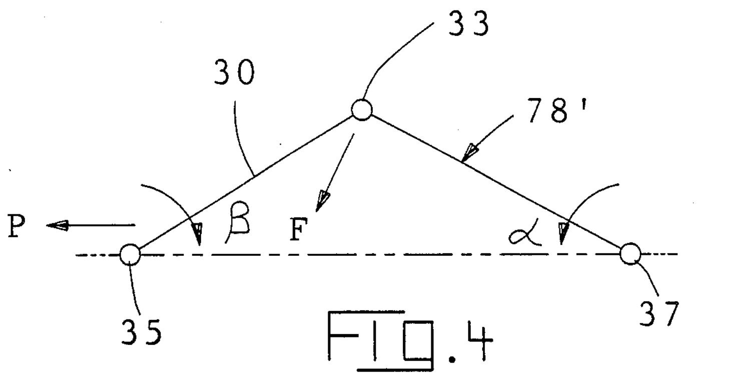
FIG. 4 is a diagramatic representation of a single acting linkage included to assist in understanding the invention mechanism.

Single action mechanisms and double action mechanisms are well known for converting rotary motion to linear motion and visa versa to do work. Indeed, such motions and linkages are widely employed in industry to achieve mechanical advantage between a given load and a given motor or engine. What I have discovered is a way to adapt the double acting linkage to a crimping tool in a way to match the available force from a motor of modest size to a crimping force travel characteristic like that above outlined. In FIG. 4, a diagramatic representation of a single action linkage is shown to include a pair of links 30 and 78' tied together as at a pin 33 to do work by displacement of the pin labeled 35, along axis A with pin 37 being stationary, through a force F operating on the radius R of link 78'. The output of this linkage as displaced through angles alpha and beta is the crimping force P originating from force F.

The formula expressing the relationship of these various parameters is;

$$P = \frac{F\,(\text{Cos Beta})}{\text{Sin (Alpha + Beta)}}$$

As is well understood, as the angles alpha and beta approach zero, P will approach infinity. With respect to single action mechanisms, levers and other such structures in relation to the work requirements of the crimps heretofore described, the problem is very simply one of running out of displacement before the maximum required force is achieved. The use of the double linkage as modified through the mechanism hereinafter to be disclosed effectively doubles the available displacement at the tail end of linkage movement; where alpha+beta approach zero.

Figure 5:
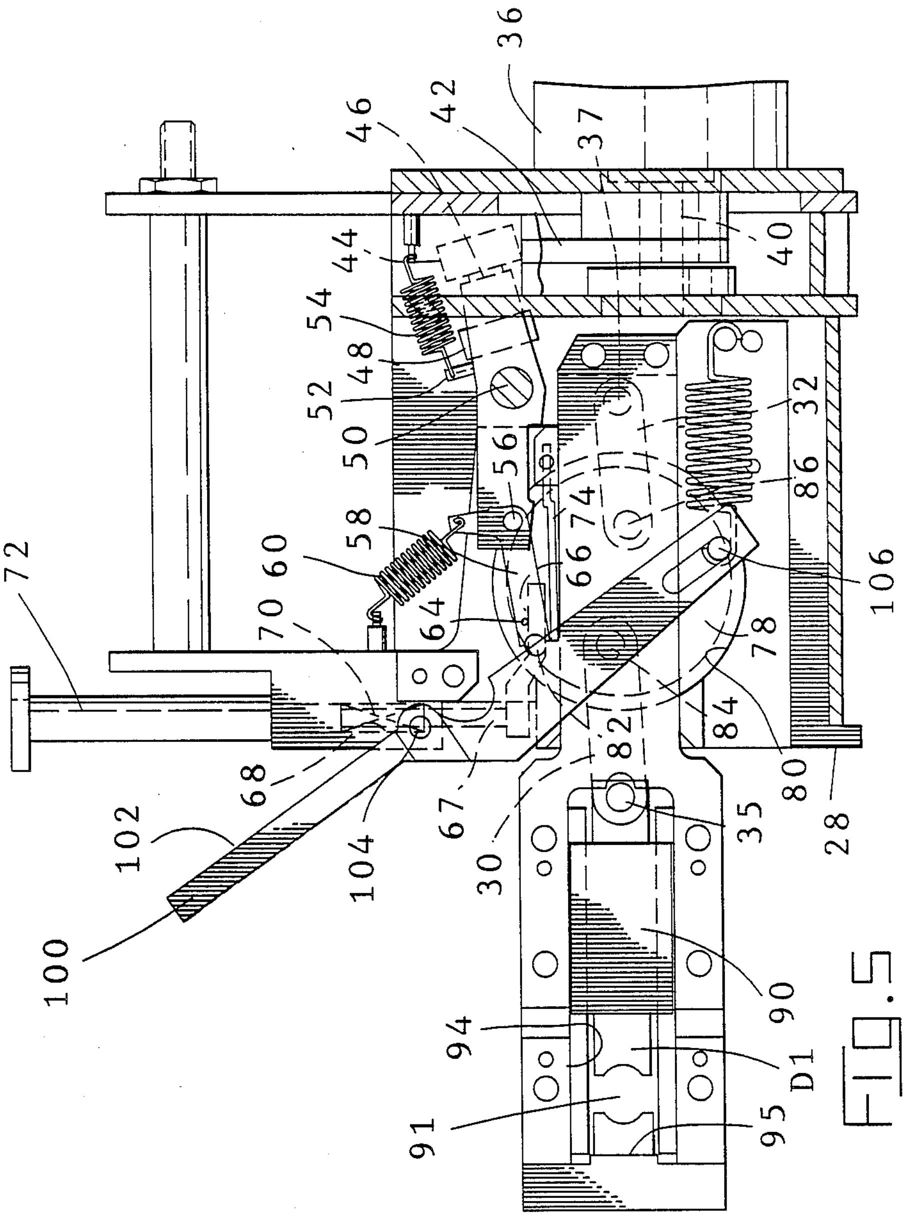
FIG. 5 is an elevational view, with parts sectioned, of a crimping tool mechanism and motor drive in accordance with the concept of the invention.
Figure 8:
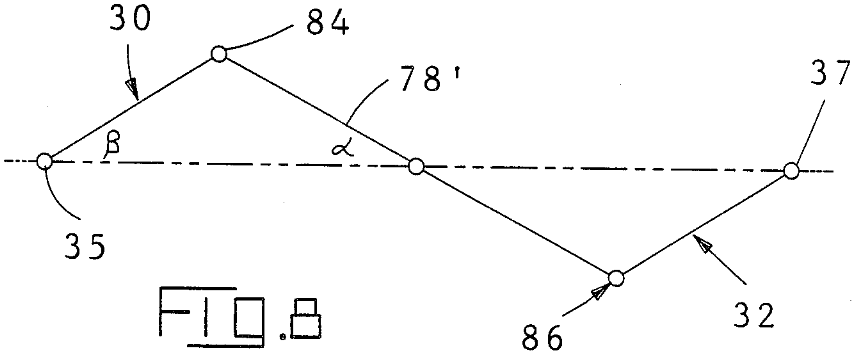
FIG. 8 is a diagramatic representation of the linkages of the mechanism of the invention intended to aid in its understanding.

Referring now to FIGS. 5 and 8, actual linkages 30, 32 are shown as interconnected to sliding die carrying elements 90 and 95, all mounted in a tool frame labeled 28. Driving pins 35 and 37, schematically represented in FIG. 8, may be observed in FIG. 5 as pins carried at the ends of the links 30 and 32. A common axis CA is shown in both FIGS. 5 and 8 to clarify movement of die carrying elements 90 and 95 and driving pins 35 and 37.

Figure 6:
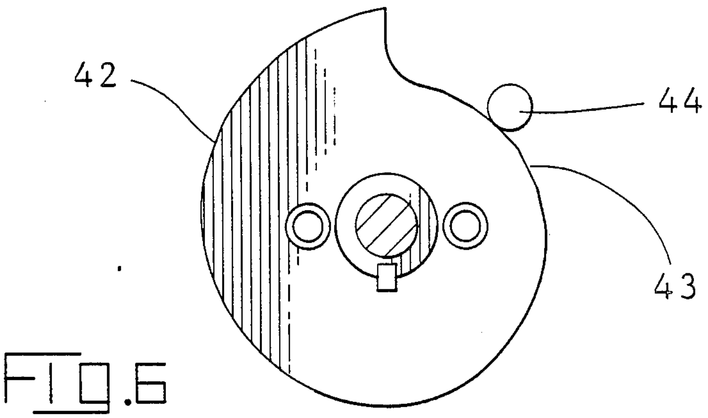
FIG. 6 is an end view showing the configuration of the cam and cam follower of the mechanism of FIG. 5.
Figure 7:
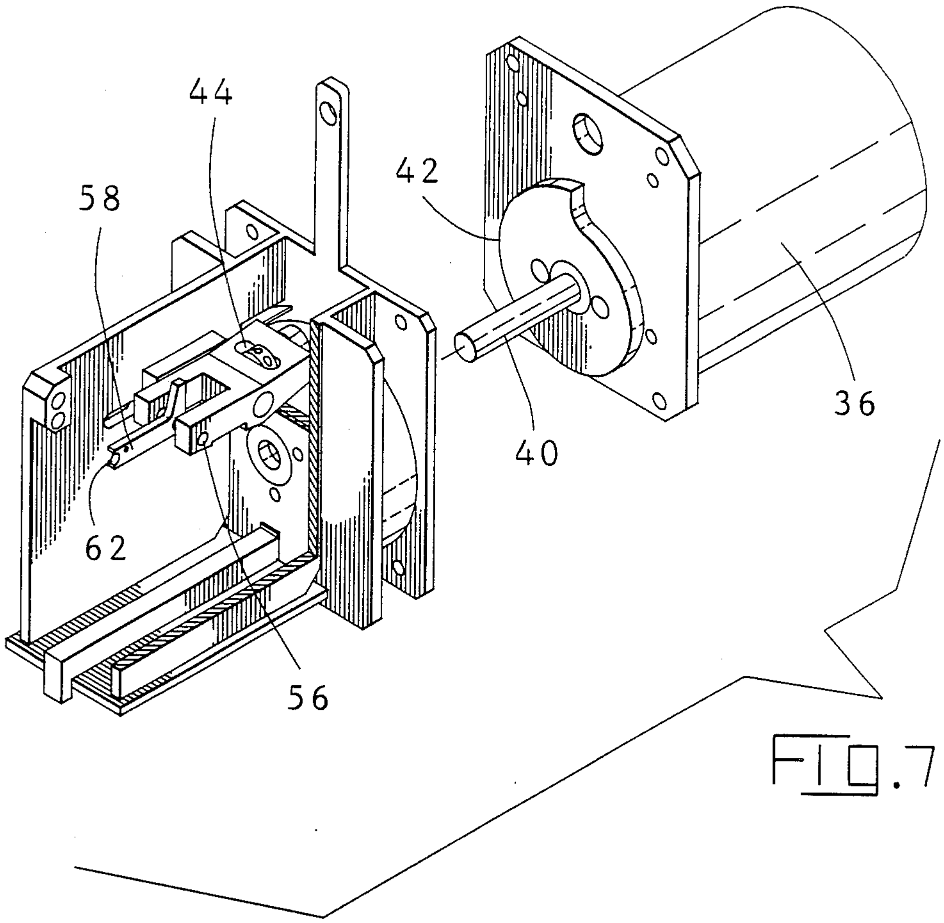
FIG. 7 is a partial perspective view of the assembly tool shown in FIG. 5.

Beginning at the right-hand side of FIG. 5 and of FIG. 7, it will be observed that there is mounted a motor which is a commonly available motor gear set which in an actual embodiment was 3GK 50KA/-3IKT5GK-Oriental Motor, 15 W. 1500 RPM. This motor gear set is shown as 36 having an output shaft 40, in turn driving a cam shown as 42 in FIG. 5 and in FIG. 6 in a rotary movement to in turn drive the cam surface 43 in engagement with a cam follower 44. The cam follower 44 is mounted for rotation on an axle 46 tied to part of a toggle linkage shown as 48, itself mounted to the frame 28 by a pin 50. The toggle 48 includes a projection shown as 52 in FIG. 5 carrying a spring 54 tied to frame 28 as shown which pulls the linkage 48 in a clockwise direction causing the cam follower 44 to bear down upon the cam surface 43.

As can be appreciated from viewing FIGS. 5, 6, and 7, rotation of the cam 42 will cause the cam follower and thus the toggle linkage 48 to be driven in an oscillatory fashion up and down around an axis formed by the pin axle 50.

At the end of the toggle linkage 48, pinned as at 56, is a further link 58 which is biased counterclockwise by a spring shown as 60 in FIG. 5, in turn tied to the frame 28. Link 58 has at the end opposite to the pin 56 a curved surface 62, best shown in FIG. 7, which forms the pushing surface of the linkage responsive to operation of the motor and cam and cam follower heretofore described. As can be seen in FIG. 5. Link 58 also includes a projecting pin 64 which bears down against a foot 66 carried by a shaft 67 which is part of an operating mechanism mounted in a bore shown as 68 and spring loaded upwardly by the spring shown as 70. The upper end of this mechanism shown as 72 can be depressed to initiate a tool operating cycle. It does this by allowing the reciprocating movement of toggle linkages and the resulting to and fro movement of linkage 58 to be displaced downwardly so that the pin 64 rides on flexible rod 74 mounted in a cantilever fashion, where said rod is mounted to the frame 28 and positioned to allow the curved surface 62 to engage a pin 82 shown projecting from a rotary disk element 78.

The disk element 78 is mounted in a race 80 which is formed from part of the frame 28. As shown in FIG. 5 and in FIG. 8, the rotary disk element 78 includes the pin 82 and a pair of pins 84 and 86 which are connected to the links 30 and 32.

The pin 35 carried by link 30 is connected to a sliding element shown as 90 driven inwardly toward a terminal center point 91, and carrying die D1. The element 90 is confined for reciprocating linear movement within a further element 94. The pin 37 carried by the link 32 is connected to the element 94 which is confined for reciprocating linear movement within the tool frame 28, but in a direction opposite to that of the element 90. Therefore, as the element 90 is driven in a direction toward the terminal center point 91, an inner end 95 of an aperture within the element 94 is also driven toward the terminal center point 91 in opposing relation with the element 90. The element 90 carries the die D1 while the element 94 carries the die D2 on the inner end 95, as shown in FIG. 5.

Attached to the rotary driving element 78 is an arm 100 which includes an outwardly projecting portion 102 mounted for rotary movement by a pin 104 tied to the frame 28, the arm 100 further being tied to disk element 78 as at pin 106 so that movement in a clockwise sense of the arm 100 rotates disk element 78 in a clockwise sense.

In operation, as the linkage comprised of toggle linkage 48 and 58 are caused to reciprocate, driven by follower 44, cam 42 and motor 36, downward displacement of the mechanism by a vertical downward pressure upon element 72 will allow the curved end of 58 shown as 62 to engage the pin 82, rotating the disk element 78 counterclockwise in turn driving the linkages 30 and 32 apart, which in turn will cause the dies D1 and D2 to be driven together to effect a crimp. At this time pin 64 will ride upon rod 74. Release of the mechanism 72 will result in pin 64 being returned upwardly with the foot 66 carrying the link 58 upwardly via pin 64 to prevent engagement with the end thereof with the pin 82. Movement of the arm or lever 100 in a clockwise sense will restore the disk element 78 to an initial position as limited by a pin not shown. In practice, the crimping cycle can be initiated by closure of a switch not shown to activate motor 36 causing a rotation of the cam and displacement of the cam follower with the result of the dies being driven towards each other and with suitable microswitches limiting the rotation of the cam. Thereafter, displacement of lever 100 will restore the dies to the open position with the result of a terminal having been placed therein, carrying a wire being crimped.

A correlation between the action of the mechanism shown in FIGS. 5, 6, and 7 to the schematic shown in FIG. 4 is shown in FIG. 8 wherein the end elements are identified along with the linkages and appropriate angles and the disk element 78 being represented by linkage there shown as 78'.

The embodiment of the invention tool shown in FIGS. 5–7 may be operated in a variety of modes including that mode described which is partially manual or it may be, with additional circuitry, not shown but conventional, operated in other modes wherein the motor is continuously cycled during a given period of use of the tool with the terminals placed within the dies preloaded with wires and crimped and cycles initiated thereafter by manipulation of the elements 72 and 100.

In an actual embodiment of the tool mechanism, terminals similar to those shown in FIGS. 1 and 2 were crimped by dies of the configuration shown in FIGS. 1 and 2 and in FIGS. 5 and 7 with such terminals being tested for mechanical retention of the wires being found satisfactory. To give perspective, the rotary disk element 78 was approximately 2 inches in diameter with the links 30 and 32 being roughly 1.2 inches in length from pin to pin. The overall displacement of dies was roughly 0.400 inches.

While pin elements projecting from the disk element have been employed in an illustrative embodiment, it is to be understood that surfaces in the edge of the disk and toggle ends may alternatively be employed to effect the driving action of the disk element.

I claim:

1. A crimping tool for crimping an electrical terminal to an electrical conductor wire including a pair of dies of a geometry to effect an inelastic deformation of the terminal and the wire to form an interconnection upon said dies being displaced inwardly, frame means housing a pair of slide elements each carrying a die and including surfaces supporting said slide elements for reciprocating movement along a common axis, a disk element mounted for rotary movement in said frame, a pair of links each having a link axis and each pivotally tied at one end to a slide element and each tied pivotally at the other end thereof to said disk element, said pair of links to be driven by said disk upon rotation thereof by said disk, said links being positioned to be driven wherein the link axis is at an angle relative to said common axis on the order of less than 45 degrees toward an angle relative to said common axis on the order of zero by rotation of said disk element, said links being further positioned to be driven in compression and thereby driving said slide elements and said dies for effecting a crimp of said terminal and wire.

2. The tool of claim 1 including means to drive said disk comprised of a toggle including one end to push said disk in rotary movement and the other end to be driven by a cam means in oscillatory movement.

3. The tool of claim 2 including first means to bias said toggle end out of engagement with said disk to preclude rotary movement thereof and second means to bias said toggle into engagement with said disk to effect said rotary movement.

4. The tool of claim 2 including motor means for driving cam means to drive said toggle and thereby drive said disk.

5. The tool of claim 1 wherein the said links are positioned to push the said slide elements to effect said crimp responsive to disk rotation in one direction and pull the said slide elements responsive to disk rotation in an opposite direction to effect the displacement.

6. A crimping tool for crimping metallic elements together effecting an inelastic and permanent joining thereof including die elements and slide means to drive said elements toward each other in closure and apart in a reciprocating motion along a common axis, driving means including a double action linkage having a pair of links and means positioning said links to cause one end of the said pair of links to move along said axis and the other end each of said pair of links to move transversely and toward said axis wherein the angle of a given link relative to said axis approach zero as said dies close thereby developing a mechanical advantage approaching infinity for said linkage driving said pair of links in compression to drive said slide means and said die elements to effect said crimp.

7. The tool of claim 6 wherein there is included a disk element and a frame having a race to house said disk element for rotary movement and each of said pair of links is tied to said disk at the said other end of said link with means to drive said disk element in rotary movement to in turn drive said links and drive said die elements.

8. In a crimping tool for effecting the permanent joining of a first element to a second element through inelastic deformation of both elements, a pair of dies for engaging said elements, a pair of slides for carrying said dies, frame means mounting said slides for reciprocating movement along a common axis, a rotary disk element mounted in said frame means and a pair of links each having one end pivotably tied to a slide and the other end pivotably tied to the said disk element with the links positioned to be displaced by rotation of said disk and driven in compression to drive said slides and dies to effect the joining of said elements and drive means to drive said disk element in rotary movement.

9. The tool of claim 8 wherein said drive means includes a toggle and there is provided a cam for driving one end of said toggle.

10. The tool of claim 9 wherein there is included means biasing the end of the said toggle for selective engagement with said disk element to activate a crimping cycle.

* * * * *